United States Patent [19]

Conrad

[11] Patent Number: 4,597,539
[45] Date of Patent: Jul. 1, 1986

[54] APPARATUS FOR CUTTING AND ASPIRATING FILAMENTARY MATERIAL TO WASTE

[75] Inventor: Peter Conrad, Charlotte, N.C.

[73] Assignee: Celanese Corporation, New York, N.Y.

[21] Appl. No.: 752,984

[22] Filed: Jul. 8, 1985

[51] Int. Cl.⁴ .................. B65H 54/02; B65H 67/04
[52] U.S. Cl. ................. 242/18 PW; 242/18 R; 242/35.5 A
[58] Field of Search ......... 242/18 PW, 18 R, 18 DD, 242/18 A, 35.5 A; 226/97; 57/278, 279, 280

[56] References Cited

U.S. PATENT DOCUMENTS

| | | | |
|---|---|---|---|
| 4,023,741 | 5/1977 | Schar | 242/18 PW X |
| 4,052,017 | 10/1977 | Schar | 242/35.5 A |
| 4,079,898 | 3/1978 | Murakami et al. | 242/35.5 A |
| 4,108,388 | 8/1978 | Schar | 242/18 PW X |
| 4,437,617 | 3/1984 | Cardell | 242/18 PW X |
| 4,496,109 | 1/1985 | Cardell | 242/18 PW X |

Primary Examiner—Stanley N. Gilreath
Attorney, Agent, or Firm—Robert J. Blanke

[57] ABSTRACT

A winder for filamentary material includes a cutter/aspirator which severs a filament and sucks-in same under negative pressure. The filament travels through a stiff tube while the cutter/aspirator and tube are lowered toward a filament throw-on device as a filled package is being replaced. The stiff tube is connected to a saddle which is mounted on a driven endless belt. The belt travels across an open side of a vertical chamber. A waste duct communicates with the chamber to create a negative pressure therein which is communicated through the belt and to the tube. As the tube is lowered, it is maintained continuously in communication with said chamber to conduct the filament to waste.

12 Claims, 12 Drawing Figures

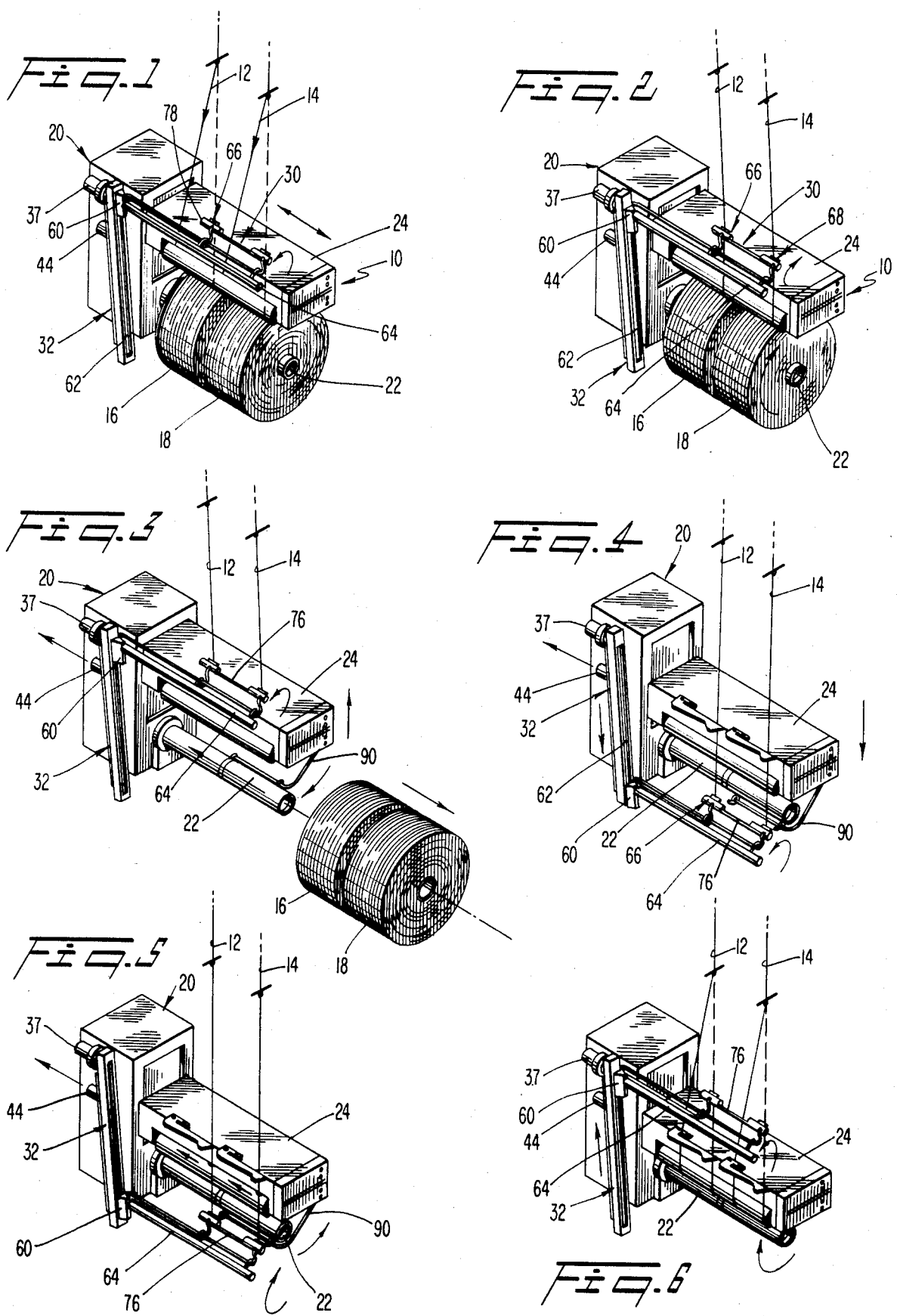

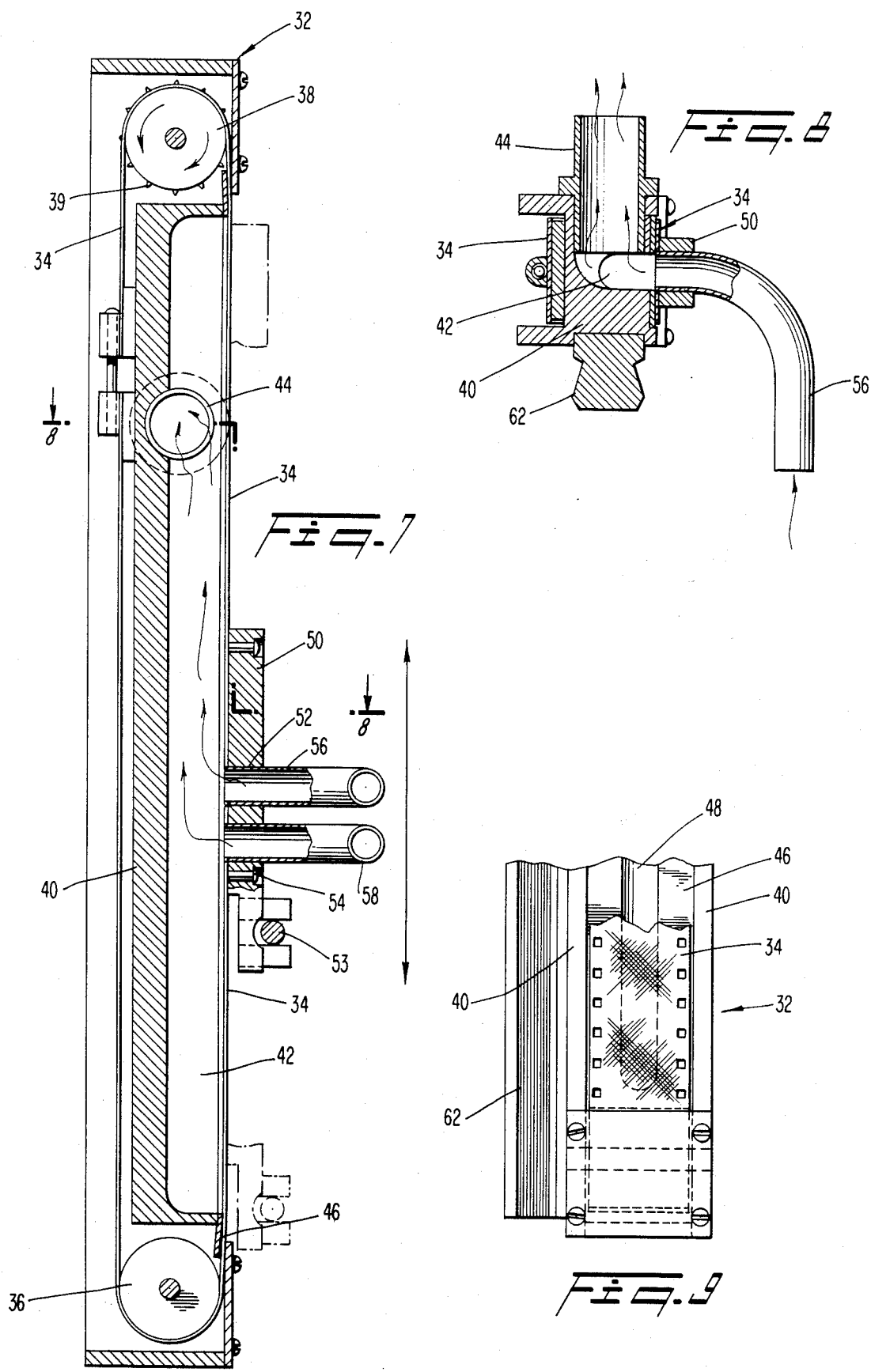

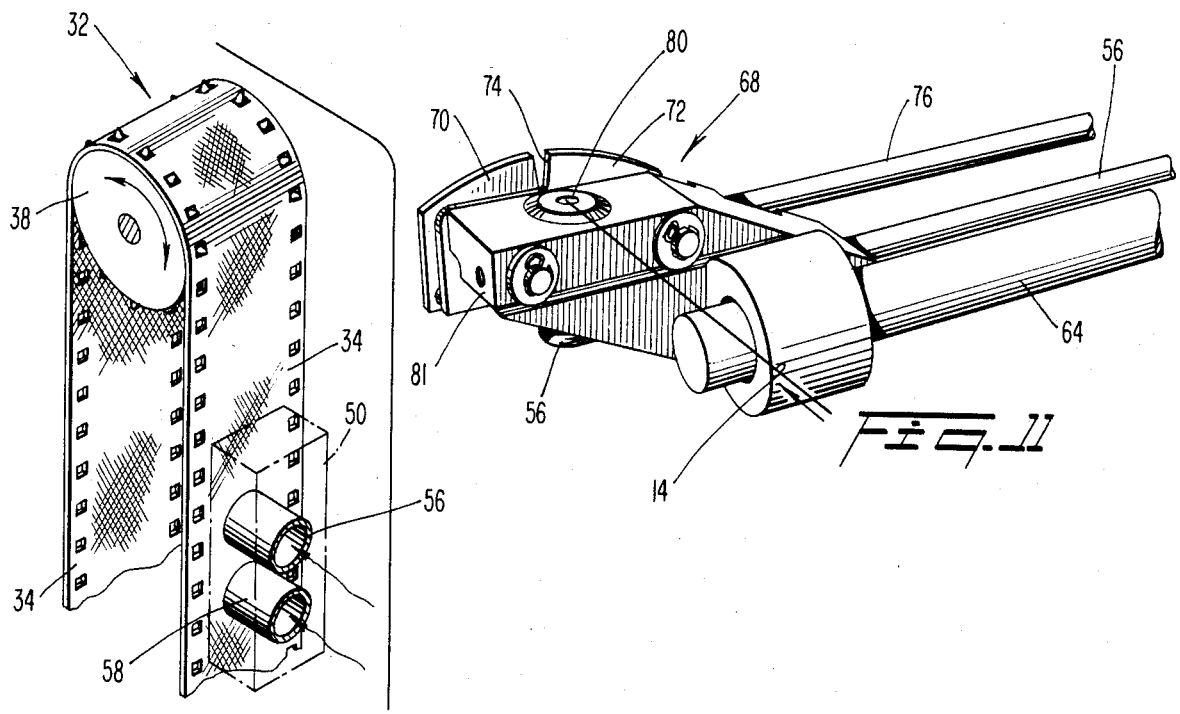
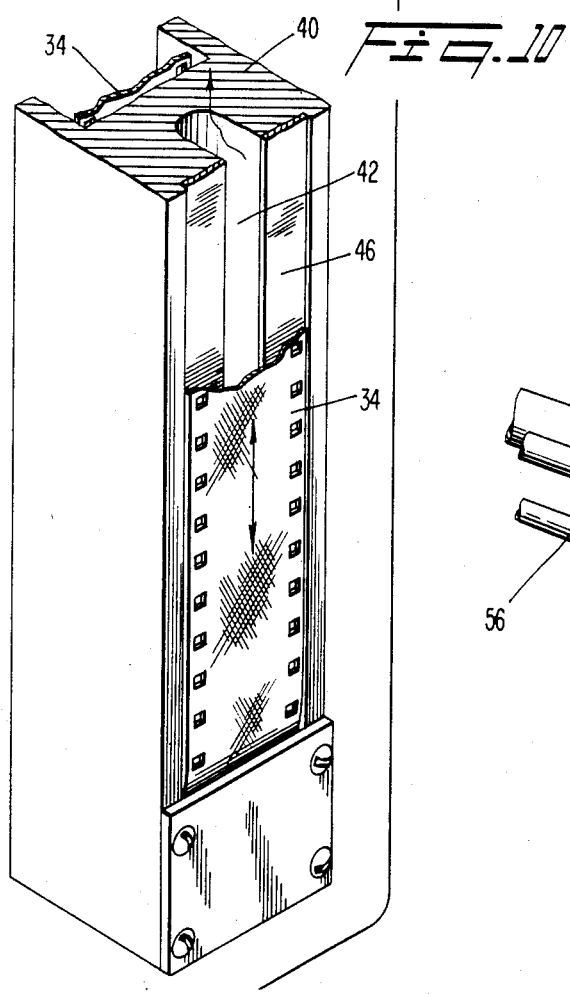
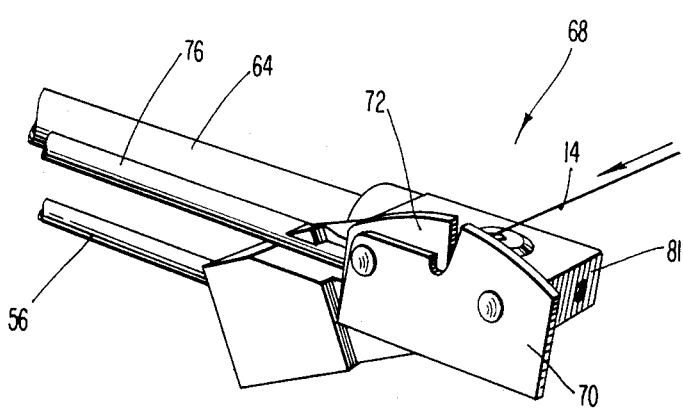

APPARATUS FOR CUTTING AND ASPIRATING FILAMENTARY MATERIAL TO WASTE

BACKGROUND AND OBJECTS OF THE INVENTION

The present invention relates generally to the high speed winding of filamentary material onto tubes or spools to form packages of filamentary material. More particularly, it relates to the handling of man-made filament yarn during the final stages of winding a full package.

The manufacture of man-made or synthetic filament yarns is typically achieved by extruding a molten polymer, such as polyester, polyamide, etc., through hole(s) in a spinneret and then cooling the filament(s) thus formed. Thereafter, the filaments may be gathered together to form a multi-filament yarn and, possibly after further treatment, are wound onto a tube so that a yarn package is formed.

Winding of the yarn is performed mechanically by winders which rotate one or more tubes to wind-up the yarn while traversing the yarn along the tube axis to achieve a uniform thickness of yarn being wound.

A doffing/donning operation (i.e., replacement of the yarn packages with empty tubes on the winder) is often performed manually by an operator who (i) severs the yarn, (ii) stops the rotary drive to the packages, (iii) replaces the packages with empty tubes, (iv) re-establishes the rotary drive between the winder drive head and the tubes, and (v) rethreads the yarn onto the empty tubes. Severing of the filamentary yarn is typically performed with scissors while the inlet of a suction or aspirator gun is held against the yarn at a location above the point of severing. Once the yarn is severed, the trailing end of the yarn is wound onto the yarn package, while the newly formed leading end of the yarn is sucked into the aspirator and fed to a waste collector. The suction gun is then placed onto a holder while the yarn packages are being replaced by empty tubes. When the empty tubes attain full speed, the operator manipulates the suction gun to attach the yarn to the rotating tubes so that this winding operation may begin.

In order to economize such winding operations, it has heretofore been proposed to mechanize the doffing and donning operations to a certain extent by providing a mechanism which automatically severs, aspirates and rethreads the yarn. Exemplary of proposed mechanisms of that type are the disclosures in U.S. Pat. No. 4,023,741 issued to Schar on May 17, 1977; U.S. Pat. No. 4,052,017 issued to Schar on Oct. 4, 1977; U.S. Pat. No. 4,108,388 issued to Schar on Aug. 22, 1978; and U.S. Pat. No. 4,496,109 issued on Jan. 29, 1985 from application Ser. No. 06/499,005, a division of application Ser. No. 06/258,309 filed Apr. 28, 1981, now abandoned.

In the Schar '388 patent a filament handler is arranged to travel along a row of winders to sequentially service the winders. The winders are of the type upon which a single bobbin is being wound at a given time. The filament handler comprises a cutter/aspirator unit which approaches the filament in a direction parallel to the axis of rotation of the bobbin, i.e., within the plane of oscillation of the filament. The cutter severs the filament which is immediately aspirated to waste. After the bobbins have been replaced, the cutter/aspirator unit is rotated about an axis disposed parallel to the bobbin axis so as to transfer the filament downwardly for being "thrown" onto the new bobbin.

Such a mechanism involves certain problems, including the need to properly align the cutter/aspirator unit with the filament every time that the unit arrives at a winding station. In that regard, it will be appreciated that even a relatively small amount of misalignment between the cutter/aspirator unit and the filament is sufficient to prevent a proper cutting of the filament from being achieved.

A further problem relates to the difficulty in adapting such a mechanism to winders of the type which simultaneously wind a plurality of filaments onto coaxially rotating bobbins. That is, it is difficult for the mechanism to cut and aspirate a plurality of filaments and then transfer the filaments onto respective bobbins.

The above problems have been overcome by a mechanism proposed in the above-mentioned application Ser. No. 06/258,309. In that mechanism, each winder is provided with its own filament-handling mechanism. The mechanism is constrained to move along a fixed path which assures that there will occur proper alignment between the cutter/aspirator unit and the filament(s). The cutter/aspirator unit moves parallel to the bobbin axis to cut and aspirate a plurality of filaments. However, the filaments are transferred downwardly for a "throw-on" step by separate arms which move vertically relative to the cutter/aspirator unit. The provision of transfer arms for acting upon respective filaments enables the filaments to be thrown onto the proper bobbin. Such an arrangement involves two relatively moving members, i.e., the cutter/aspirator unit and the transfer arms, whereas it may be desirable to reduce the number of relatively moving parts.

It is also desirable to employ a stiff tube through which the filamentary material is exhausted to waste in order to assure that proper engative pressures and a smooth travel path are maintainted in the tube. The use of flexible tubes may lead to the formation of bends or curves which are too abrupt to ensure proper transport of the filamentary material.

It is, therefore, an object of the present invention to provide a novel apparatus for aspirating filamentary material to waste.

Another object is to provide such an apparatus in which enables filamentary material to be aspirated by means of a downwardly traveling aspirator which communicates with a stiff tube.

A further object is to provide such an apparatus in which a plurality of filamentary materials can be simultaneously aspirated.

An additional object is to provide such an apparatus which minimizes the number of components.

SUMMARY OF THE INVENTION

These objects are achieved by the present invention which involves an apparatus for winding continuously approaching filamentary material. The apparatus comprises a rotary spindle for supporting a tube upon which the filamentary material is wound. A cutter mechanism cuts the filamentary material when the tube is full. An aspirator sucks-in the approaching filamentary material after the filamentary material has been cut. A mechanism moves the aspirator downwardly to displace the filamentary material toward the spindle and toward an empty tube mounted on the spindle. A conducting mechanism conducts the filamentary material from the aspirator to waste. The conducting mechanism comprises a chamber having a vertical opening at one side. A belt is mounted for travel along the opening. A duct communicates with the chamber for transmitting a negative pressure therein to draw the belt against the opening. A member is connected to the belt and includes a passage therethrough which communicates continuously with the chamber as the member travels along the opening. A tube communicates with the passage and with the aspirator for conducting the filamentary material from the aspirator to the chamber for discharge to waste through the duct. A mechanism moves the member and the aspirator downwardly together.

THE DRAWING

The objects and advantages of the invention will become apparent from the following detailed description of a preferred embodiment thereof in connection with the accompanying drawings in which like numerals designate like elements, and in which:

FIGS. 1-6 are perspective views of a winding apparatus depicting the various stages of handling yarns during the replacement of filled packages;

FIG. 7 is a vertical sectional view taken through a suction chamber mounted alongside the winder frame;

FIG. 8 is a cross-sectional view taken along line 8—8 in FIG. 7;

FIG. 9 is a fragmentary side elevational view of the chamber with a portion of a belt broken away;

FIG. 10 is a perspective view of the chamber, with a portion thereof omitted to depict the belt;

FIG. 11 is a top perspective view of a portion of a cutter/aspirator; and

FIG. 12 is a bottom perspective view of the cutter/aspirator of FIG. 11.

DETAILED DESCRIPTION OF A PREFERRED EMBODIMENT OF THE INVENTION

In FIGS. 1-6 there is depicted a winding apparatus 10 which winds a pair of filamentary materials such as yarns 12, 14 onto a pair of tubes 16, 18, respectively to form packages. The winding apparatus comprises a main frame 20 which carries a horizontal spindle 22 on which the tubes 16, 18 are mounted, as well as a head 24 located above the spindle 22. The head 24 carries a plurality of drive rolls (not shown) which engage the peripheries of the packages to rotate the latter. The head 24 is movable vertically relative to the spindle 22 to enable the packages to be replaced when full.

During replacement of the packages with empty tubes, it is necessary to conduct the yarns 12, 14 to waste, since a cessation of yarn production is not possible. Accordingly, a yarn cutter/aspirator unit 30 is mounted on the frame 20. The cutter/aspirator unit 30 includes a pair of cutters which sever a respective yarn and a pair of aspiration inlets into which the severed yarns are sucked. The cutter/aspirator unit 30 is mounted for vertical movement on the frame 20. In that regard, a vertical post 32 is mounted to one side of the frame 20. Within the post 32 is mounted a vertically traveling endless belt 34 (FIG. 7). The belt 34 extends around a pair of pulleys, i.e., a lower idler pulley 36 and an upper drive pulley 38 which is driven by any suitable type of motor 37. The drive pulley 38 includes projections 39 which engage recesses in the belt to positively drive the belt.

The post 32 includes a stationary wall 40 which includes a chamber 42 that opens toward one side. Preferably, the wall 40 opens toward the frame 20, i.e., in a direction away from the viewer in FIGS. 1-6. To that end, the post 32 is spaced slightly away from the frame 20.

Communicating with the chamber 42 is an outlet duct 44 which is connected to a suitable suction source to induce negative pressure within the chamber. Disposed across the open end of the chamber within a recess in the wall 40 is a wear plate 46 which includes a vertical slot 48. The belt 34 travels across the wear plate 46 in a manner covering the slot 48 as is depicted in FIG. 9. The wear plate can be formed of a suitable low friction material to facilitate sliding of the belt thereacross.

The belt is preferably made of thin metal and is sucked against the wear plate by the negative pressure within the chamber 42 to create an air-tight seal between the edges of the belt and wear plate.

Affixed to the belt 34 is a saddle 50 which includes one or more air passages 52, 54. Preferably, a separate air passage is provided for each yarn being wound on the winder. In the case depicted there are two yarns 12, 14 and two passages 52, 54 associated therewith. The passages 52, 54 are adapted to connect to the ends of tubes 56, 58 which extend to the cutter/aspirator unit 30 for conducting the filaments to the air passages 52, 54. The tubes are formed of a stiff material such as metal and communicate with holes in the belt 34. Those holes are aligned with the slot 48 in the wear plate 46, so that the yarns pass into the chamber 42 under the action of the negative pressure within the chamber 42. Thus, the yarns are sucked separately through the tubes 56, 58, into the chamber 42 and then into the outlet duct 44 which transports the yarns to waste.

If desired, a single tube 52 or 54 could be employed to transport both yarns to the chamber 42, although it has been found that the use of separate tubes is desirable for establishing proper suction pressure to transport the yarns.

It will be appreciated that in accordance with the present invention, the saddle 50 is raised and lowered while maintaining the tubes 52, 54 in constant communication with the outlet duct 44 and thus promotes the use of a cutter/aspirator unit of the type which cuts and aspirates yarns and which is lowered to bring the yarns to a string-up position adjacent newly installed tubes.

A preferred type of cutter/aspirator unit which can be utilized with the waste suction apparatus of the present invention comprises a carrier 60 which is mounted on a suitable track 62 on the post 32 (FIG. 1). The carrier is connected to the saddle 50, e.g., by means of a connecting pin 53 which projects from the saddle, so that the carrier 60 travels upwardly and downwardly with the saddle 50. The carrier carries an arm 64 which is rotatable about its own longitudinal axis. In that regard, the carrier 60 may contain a suitable motor (not shown), e.g., fluid driven, which rotates the arm in an oscillatory manner about its own longitudinal axis. Mounted fixedly to the arm 64 are a pair of cutter mechanisms 66, 68 (shown schematically in FIGS. 1-6 and in more detail in FIGS. 11, 12). Each cutter mechanism 66, 68 functions to cut one of the yarns 12 or 14. In FIG. 11 the cutter mechanism 66 is depicted as viewed from above after the yarn 14 has been severed and is traveling into the tube 56. The cutter mechanism 66, 68 can each be of any suitable type, such as the type comprising a stationary blade 70 and a movable blade 72, which blades define a notch 74 therebetween. Both movable blades 72 are connected to a common actuator rod 76, which rod is connected to a motor 78 (FIG. 1) such as a fluid motor which is operable to reciprocate the rod and thus the movable blades 72. In so doing, the notches 74 are closed in a scissors-type manner to cut yarns passing therethrough. Normally, the cutter mechanisms 66, 68 are held in an upward out-of-the-way position during a winding operation. When it becomes time to remove filled packages, however, the arm 64 is rotated about its longitudinal axis (FIG. 2) to bring the cutter mechanisms downwardly and forwardly into the oscillatory path of travel of the yarns (i.e., the solid line path of travel in FIG. 1). As the yarns traverse the cutter blades, the yarns enter the notches 74 and are caught therein. Thereafter, the rod 76 is reciprocated along its longitudinal axis to sever the yarns. A suction inlet 80 is located in a block 81 immediately above the notch so that the yarn travels thereacross just before being severed and becomes sucked thereinto upon being severed (see the broken line path of filament travel in FIG. 1). The suction inlet communicates with the respective tube 56 or 58 to be negatively pressurized thereby.

FIGS. 11 and 12 depict the cutter mechanism 68 from above and below, respectively, following the severing of the yarn 14. After the yarns 12, 14 have been severed they are conveyed through the tubes 56, 58, the chamber 42, and the duct 44. Thereupon, the arm 64 is rotated about its longitudinal axis such that the cutter mechanisms 66, 68, together with the yarns 12, 14 are moved up and back (FIG. 3). At the same time, the head 24 is raised so that the filled packages 16, 18 can be removed from the spindle 22. As empty tubes are being installed onto the spindle, the belt 34 is actuated to lower the saddle 50 and thus the carrier 60 (FIG. 4). As this occurs, the yarns continue to be exhausted to waste through the chamber 40.

When the saddle reaches its lowermost position, the arm 60 is rotated to move the cutting mechanisms 66, 68 forwardly and downwardly to position the yarns within the pigtails of a conventional throw-on device 90. The latter is activated to insert yarns into the pick-up grooves of the tubes which have now been rotated to full speed. The yarns are then wound upon the empty tubes, and the belt 34 is reactivated to raise the saddle 50 and carrier 60 to the upper position (FIG. 6).

It will be appreciated that the arrangement of the belt 34, saddle 50, and chamber 40 enables the yarns to be sucked to waste even as the saddle is being raised and lowered. This enables the yarns to be sucked to waste through a yarn handling mechanism 60, 66, 68 which is being lowered to install the yarns onto empty tubes. In other words, the present invention avoids the need to separate the suction system from the yarn transporting mechanism 60, 66, 68 as in the afore-mentioned U.S. application Ser. No. 06/258,309.

Although the present invention has been described in connection with a preferred embodiment thereof, it will be appreciated by those skilled in the art that modifications, substitutions, additions and deletions may be made without departing from the spirit and scope of the invention as defined in the appended claims.

What is claimed is:

1. In an apparatus for winding continuously approaching filamentary material comprising a rotary spindle for supporting a tube upon which filamentary material is wound, cutter means for cutting said filamentary material when said tube is full, aspirating means for sucking-in the approaching filamentary material after the filamentary material has been cut, means for moving said aspirating means downwardly to displace the filamentary material toward said spindle and toward an empty tube mounted on said spindle, and conducting means for conducting the filamentary material from said aspirating means to waste, the improvement wherein said conducting means comprises:

means defining a chamber having a vertical opening at one side, a belt mounted for travel along said opening, duct means communicating with said chamber for transmitting a negative pressure therein to draw said belt against said opening, a member connected to said belt and including passage means therethrough which communicates continuously with said chamber as said member travels along said opening, tube means communicating with said passage means and with said aspirating means for conducting the filamentary material from said aspirating means to said chamber for discharge to waste through said duct means, and means for moving said member and said aspirating means downwardly together.

2. Apparatus according to claim 1, wherein said chamber defining means includes a wear plate disposed between said belt and edges of said opening.

3. Apparatus according to claim 1, including an upper rotary pulley disposed above said opening and a lower rotary pulley disposed below said opening, said belt extending around said upper and lower pulleys.

4. Apparatus according to claim 3, including means for rotating one of said pulleys to drive said belt and said member, and means coupling said member to said aspirating means whereby the latter is moved upwardly and downwardly by said belt.

5. Apparatus according to claim 1, wherein said aspirating means comprises a plurality of aspirators, said passage means comprises an identical number of passages, and said tube means comprises an identical number of tubes.

6. Apparatus according to claim 1, wherein said cutting means is connected to said aspirating means.

7. Apparatus according to claim 1, wherein said tube means is formed of a stiff material.

8. In an apparatus comprising a vertically movable aspirating means for conducting filamentary material, and conveying means for generating negative pressure in said aspirating means and for receiving the filamentary material and conveying same to waste, the improvement wherein said conveying means comprises:

means defining a chamber having a vertical opening at one side, a belt mounted for travel along said opening, duct means communicating with said chamber for transmitting a negative pressure therein to draw said belt against said opening, a member connected to said belt and including passage means therethrough which communicates continuously with said chamber as said member travels along said opening, tube means communicating with said passage means and said aspirating means for conducting filamentary material from said aspirating means to said chamber for discharge to waste through said duct means, and means for moving said member and said aspirating means downwardly together.

9. Apparatus according to claim 8, wherein said chamber means includes a wear plate disposed between said belt and edges of said opening.

10. Apparatus according to claim 8, including an upper rotary pulley disposed above said opening and a lower rotary pulley disposed below said opening, said belt extending around said upper and lower pulleys.

11. Apparatus according to claim 10, including means for rotating one of said pulleys to drive said belt and said member, and means coupling said member to said aspirating means whereby the latter is moved upwardly and downwardly by said belt.

12. Apparatus according to claim 8, wherein said tube means is formed of a stiff material.

* * * * *